US006917353B2

(12) United States Patent
Kuijk

(10) Patent No.: US 6,917,353 B2
(45) Date of Patent: Jul. 12, 2005

(54) DISPLAY DEVICE

(75) Inventor: Karel Elbert Kuijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 55 days.

(21) Appl. No.: 09/781,383

(22) Filed: Feb. 12, 2001

(65) Prior Publication Data

US 2001/0020926 A1 Sep. 13, 2001

(30) Foreign Application Priority Data

Feb. 15, 2000 (EP) ............................................ 00200508

(51) Int. Cl.[7] ............................ G09G 3/36; G09G 5/00; H04K 1/10; H04L 27/28; G02F 1/07

(52) U.S. Cl. ......................... 345/96; 345/209; 375/260; 359/264

(58) Field of Search ............................... 345/87, 94–96, 345/98–100, 103, 204, 208–210; 375/240, 260, 275; 370/477; 359/264

(56) References Cited

U.S. PATENT DOCUMENTS 4,802,190 A * 1/1989 Schouhamer Immink ... 370/477
5,610,628 A * 3/1997 Yamamoto et al. ......... 345/100
5,677,705 A * 10/1997 Shimura et al. ............ 345/100
5,696,524 A * 12/1997 Hoshino et al. ............ 345/100
5,764,213 A * 6/1998 Tanaka et al. .............. 345/100
5,861,863 A * 1/1999 Kudo et al. ................. 345/100
5,977,943 A * 11/1999 Mano et al. ................ 345/100
6,252,573 B1 * 6/2001 Ito et al. ...................... 345/100
6,421,033 B1 * 7/2002 Williams et al. ............ 345/103

OTHER PUBLICATIONS

"Active Addressing Method for High–Contrast Video–Rate STN Displays", by Scheffer et al, SID Digest 1992, pp. 228–231.

* cited by examiner

*Primary Examiner*—Bipin Shalwala
*Assistant Examiner*—Jeff Piziali

(57) ABSTRACT

A device for multiple row addressing is driven with pulse patterns based on sets of 8 (or more) orthogonal functions which have a less varying frequency content than pulse patterns based on a set of 8 Walsh functions. Mutually orthogonal signals are obtained from at least two types of the orthogonal functions having four elementary units of time. Within the four elementary units of time, one pulse each unit of time has a polarity which is different from the plurality of the other pulses.

18 Claims, 4 Drawing Sheets

DISPLAY DEVICE

BACKGROUND OF THE INVENTION

1. Field of the Invention

The invention relates to a display device employing a liquid crystal material between a first substrate provided with row or selection electrodes and a second substrate provided with column or data electrodes, in which overlapping parts of the row and column electrodes define pixels. The display device further employs drivers for driving the column electrodes in conformity with an image to be displayed, and for driving the row electrodes which, in the operating condition, sequentially supply groups of p row electrodes with p mutually orthogonal signals. Such display devices are used in, for example, portable apparatuses such as laptop computers, notebook computers and telephones.

2. Description of the Related Art

Passive-matrix displays of this type are generally known and, for realizing a high number of lines, they are increasingly based on the STN (Super-Twisted Nematic) effect. An article by T.J. Scheffer and B. Clifton "Active Addressing Method for High-Contrast Video Rate STN Displays", SID Digest 92, pp. 228–231 describes how the phenomenon of "frame response" which occurs with rapidly switching liquid crystal materials is avoided by making use of "Active Addressing". In this method, all rows are driven throughout the frame period with mutually orthogonal signals, for example, Walsh functions. The result is that each pixel is continuously excited by pulses (in an STN LCD of 240 rows: 256 times per frame period) instead of once per frame period. In "multiple row addressing", a (sub-)group of p rows is driven with mutually orthogonal signals. Since a set of orthogonal signals, such as Walsh functions, consists of a plurality of functions which is a power of 2, i.e. $2^S$, p is preferably chosen to be equal thereto as much as possible, i.e. generally $p=2^s$ (or also $p=2^s-l$). The orthogonal row signals $F_i(t)$ are preferably square-wave shaped and consist of voltages +F and −F, while the row voltage is equal to zero outside the selection period. The elementary voltage pulses from which the orthogonal signals are built up are regularly distributed across the frame period. In this way, the pixels are then excited $2^s$ (or $(2^s-1)$) times per frame period with regular intermissions instead of once per frame period. Even for low values of p such as p=3 (or 4) or p=7 (or 8) the frame response appears to be suppressed just as satisfactorily as when driving all rows simultaneously, such as in "Active Addressing", but it requires much less electronic hardware.

However, it appears that, notably for Walsh functions, the frequency content of the functions from a complete set of functions is greatly different. Since the dielectric constant of liquid crystalline material is frequency-dependent, this may cause the liquid crystalline material to react differently at different positions in, for example, a matrix display, dependent on the image contents. This leads to artefacts in the image such as different forms of crosstalk.

SUMMARY OF THE INVENTION

It is an object of the invention to provide a display device in which a minimal number of artefacts occurs in the image.

To this end, a display device according to the invention is characterized in that the mutually orthogonal signals are obtained from at least two types of orthogonal functions having four elementary units of time, within which four elementary units of time one pulse each time has a polarity which is different from that of the other pulses.

It is found that orthogonal signals can thereby be generated which differ little in frequency content and thus do not give rise or hardly give rise to artefacts in the image. Such orthogonal signals are obtained, for example, from orthogonal functions having four elementary units of time, within which four elementary units of time the pulse having a polarity which differs from that of the other pulses each time shifts by one elementary unit of time. The use of four elementary units of time has the additional advantage that the number of column voltage levels remains limited to five, while this number is six when using, for example, three elementary units of time, within which three elementary units of time one pulse having a polarity which differs from that of the other pulses shifts by only one unit of time. A larger number of column voltage levels to be used of course leads to more expensive drive electronics.

These and other aspects of the invention are apparent from and will be elucidated with reference to the embodiments described hereinafter.

BRIEF DESCRIPTION OF THE DRAWINGS

FIGS. 2 and 3 show sets of 4 and 8 Walsh functions, respectively, and orthogonal signals derived therefrom for the purpose of multiple row addressing, while FIG. 5 shows a generalization of FIG. 4, while

DETAILED DESCRIPTION OF THE PRESENTLY PREFERRED EMBODIMENTS

Figure 1:
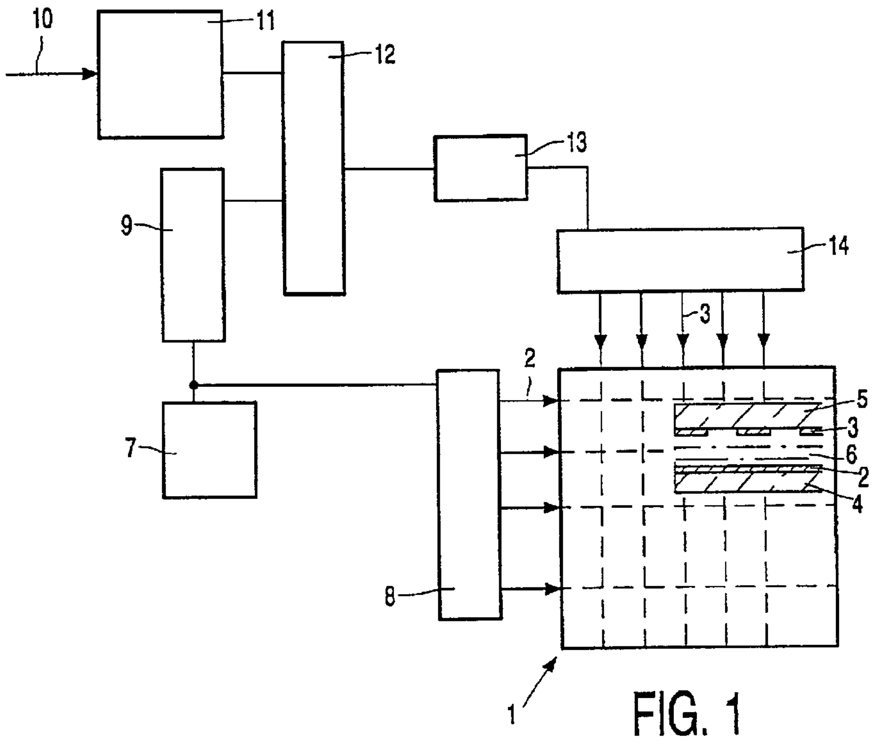
FIG. 1 shows diagrammatically a display device in which the invention is used.

FIG. 1 shows a display device comprising a matrix 1 of pixels at the area of crossings of N rows 2 and M columns 3 which are provided as row and column electrodes on facing surfaces of substrates 4, 5, as can be seen in the cross-section shown in the matrix 1. The liquid crystal material 6 is present between the substrates. Other elements such as orientation layers, polarizers, etc. are omitted for the sake of simplicity in the cross-section.

The device further comprises a row function generator 7 in the form of, for example, a ROM for generating orthogonal signals $F_i(t)$ for driving the rows 2. Similarly as described in said article by Scheffer and Clifton, row vectors driving a group ofp rows via drive circuits 8 are defined during each elementary time interval. The row vectors are written into a row function register 9.

Information 10 to be displayed is stored in a pxM buffer memory 11 and read as information vectors per elementary unit of time. Signals for the column electrodes 3 are obtained by multiplying the then valid values of the row vector and the information vector during each elementary unit of time and by subsequently adding the p obtained products. The multiplication of the values which are valid during an elementary unit of time of the row and column vectors is realized by comparing them in an array 12 of M exclusive ORs. The addition of the products is effected by applying the outputs of the array of exclusive ORs to the summing logic 13. The signals 16 from the summing logic 13 drive a column drive circuit 14 which provides the columns 3 with voltages $G_j(i)$ having p+1 possible voltage levels. Every time, p rows are driven simultaneously, in which p<N ("multiple row addressing"). The row vectors therefore only have p elements, as well as the information vectors, which results in a saving of the required hardware such as the number of exclusive ORs and the size of the summing circuit, as compared with the method in which all rows are driven simultaneously with mutually orthogonal signals ("Active Addressing").

Figure 2A:
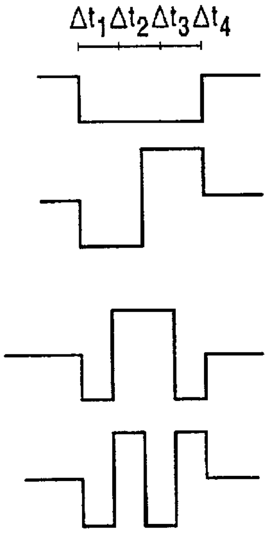
Figure 2B:
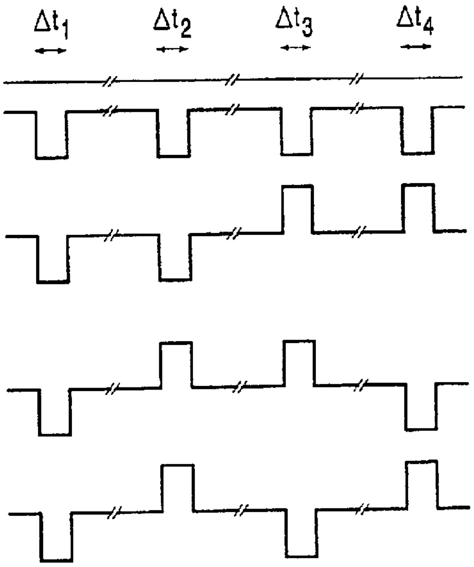
Figure 3A:
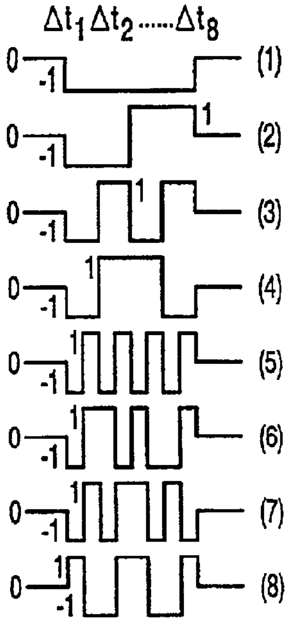
Figure 3B:
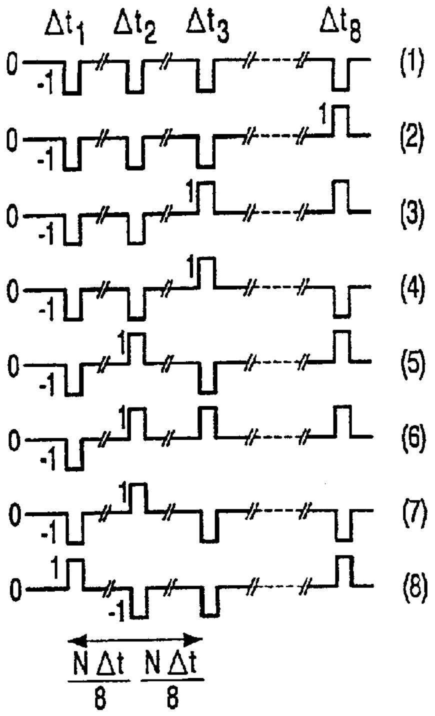

It is possible to use less drive electronics by choosing p to be low, for example, in the range between 3 and 8. FIG. 2 shows a frequently used set of orthogonal functions referred to as Walsh functions (FIG. 2*a*) and the pulse patterns derived therefrom for the purpose of multiple row addressing (FIG. 2*b*), with p=4. It is clear that the frequency content of the lumped functions, or the number of sign changes within the derived pulse patterns, greatly differs for each one of the different functions. The first function (1) comprises DC components, because the lumped function consists of half a period of a square wave, whereas the other functions do not comprise any DC component. The second function (2) comprises, within one period, a (square) wave with the double frequency of the first function. The fourth function (4) is doubled in frequency again with respect to the second function, while the third function (3) is a shifted variant of the fourth function. Even when the first function is not used to avoid DC effects, there is a great difference in frequency content of the three remaining functions. The dielectric constant of the liquid crystal material is frequency-dependent so that, dependent on the image contents, the use of such functions may lead to artefacts such as crosstalk. The same applies when using Walsh functions (FIG. 3*a*) and the pulse patterns derived therefrom for the purpose of multiple row addressing (FIG. 3*b*), with p=8.

Figure 4A:
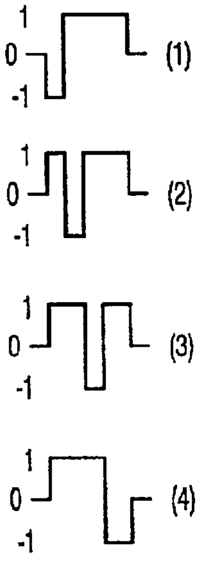
FIG. 4 shows another set of four orthogonal functions according to the invention, and orthogonal signals derived therefrom for the purpose of multiple row addressing.
Figure 4B:
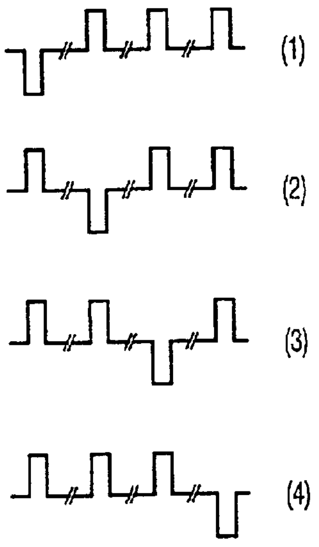
Figure 5A:
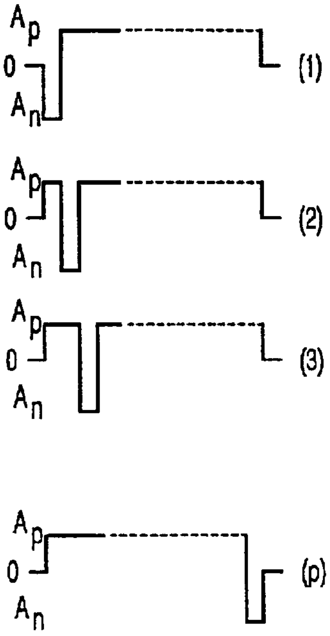
Figure 5B:
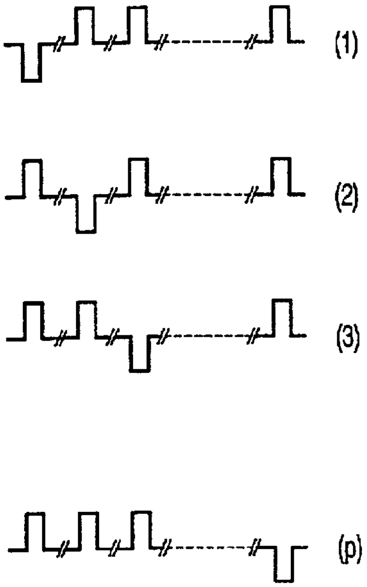

FIG. 4 shows another set of four orthogonal functions (FIG. 4*a*) and the pulse patterns derived therefrom for the purpose of multiple row addressing (FIG. 4*b*), with p=4. The frequency content of the lumped functions, or the number of sign changes within the pulse patterns derived therefrom is now substantially the same for each one of the different functions. This set is obtained by shifting the negative pulse each time by one position in the second and subsequent functions. Since such a set, in which the sign-different pulse is each time shifted by one position, is very attractive, this function is shown in a generalized form in FIG. 5 for p pulses consisting of one negative pulse and (p−1) positive pulses, with the negative pulse being shifted each time by one position in the second and subsequent functions. The positive pulses have an amplitude $A_p$ and the negative pulses have an amplitude $A_n$. To be mutually orthogonal, it holds for the two functions that their product, summed over a period of the duration of the set must be zero, or:

$$-2A_n.A_p+(p-2).A_p^2=0;\ \text{which yields}\ A_n=A_p.(p-2)/2 \quad (1)$$

In addition, the effective value of the function must be 1 (normalized for the function F). This leads to $$\frac{A_n^2+(p-1)A_p^2}{p}=1 \quad (2)$$

It follows from (1) and (2) for $A_p$ and $A_n$ that $A_p=2/\sqrt{p}$ and $$A_n=\frac{p-2}{\sqrt{p}},$$

respectively.

For p=4 it holds that $A_p=A_n=1$ and the number of possible column voltages is 5. This is higher for other values; for p=3, the number of possible column voltages is 6, namely $(-5/2)A_p$, $(-3/2)A_p$, $(-1/2)A_p$, $(1/2)A_p$, $(3/2)A_p$ en $(5/2)A_p$.

However, when using Walsh functions, the number of required column voltage levels would be 4 for p=3 (a subject chosen from a set of 4 Walsh functions).

Figure 6:
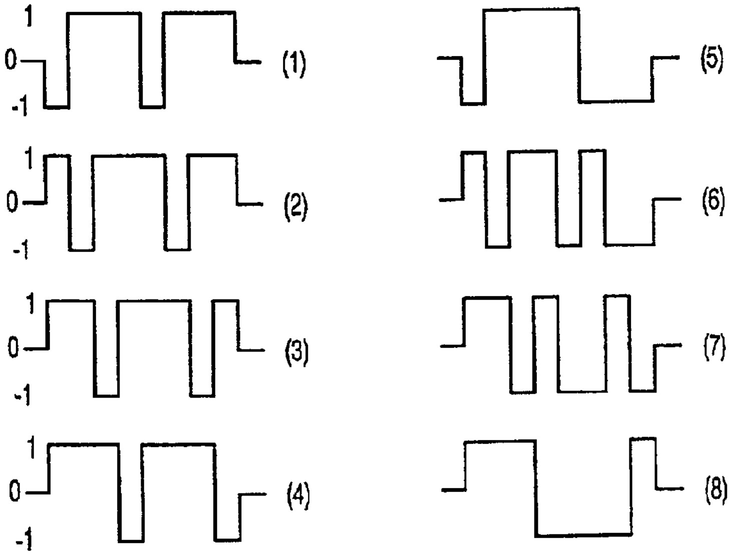
FIGS. 6 and 7 show some orthogonal signals according to the invention, derived from FIG. 5, for the purpose of multiple row addressing, and FIG. 8. shows mixed orthogonal signals according to the invention, derived from FIG. 5, for the purpose of multiple row addressing.

The invention is based on the recognition that orthogonal functions are selected as starting points based on mutually orthogonal signals obtained from at least two types of orthogonal functions with four elementary units of time, as is shown in FIG. 4. Starting from the functions of FIG. 4, these are repeated, for example, after 4 elementary units of time (patterns (1), (2), (3) and (4) in FIG. 6) or inverted and repeated (patterns (5), (6), (7) and (8) in FIG. 6). Although there is still some variation of the frequency content, these functions surprisingly appear to give less rise to artefacts than the set of 8 Walsh functions, while the number of required column voltages remains the same, namely 9.

The pulse patterns derived from (1), (2), (3) and (4) comprise a DC component. To reduce its influence, preferably 2 of these pulse patterns in a set to be chosen are inverted (the DC content is now opposed). For a completely DC-free drive, all signals from the used set are inverted after each frame period.

Figure 7:
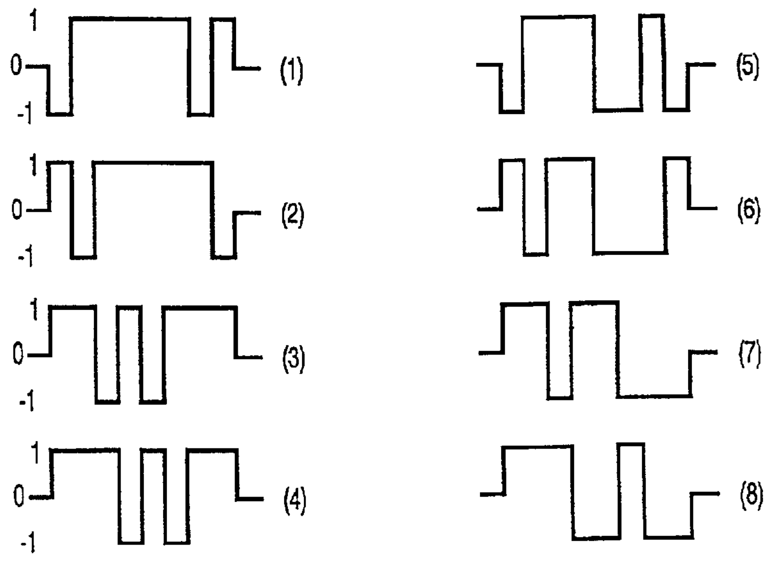

This set is denoted as K8(5,r) (Kuijk function) because in the fifth (5,*) pattern, the negative pulse starts in the second half period with a negative pulse (at the fifth position) which shifts to the right (5,r) in the subsequent patterns. FIG. 7 shows the Kuijk function K8(7,r). It holds for both Figures that the pulse patterns derived from the patterns (5), (6), (7) and (8) are DC-free. Overall, 8 of these sets can be formed in this way, namely K8(5,r), K8(6,r), K8(7,r), K8(8,r), K8(5,1), K8(6,1), K8(7,1) and K8(8,1) in which 1 indicates that the negative pulse starts in the second half period with a negative pulse (at the specified position) which shifts to the left in the subsequent patterns.

Figure 8:
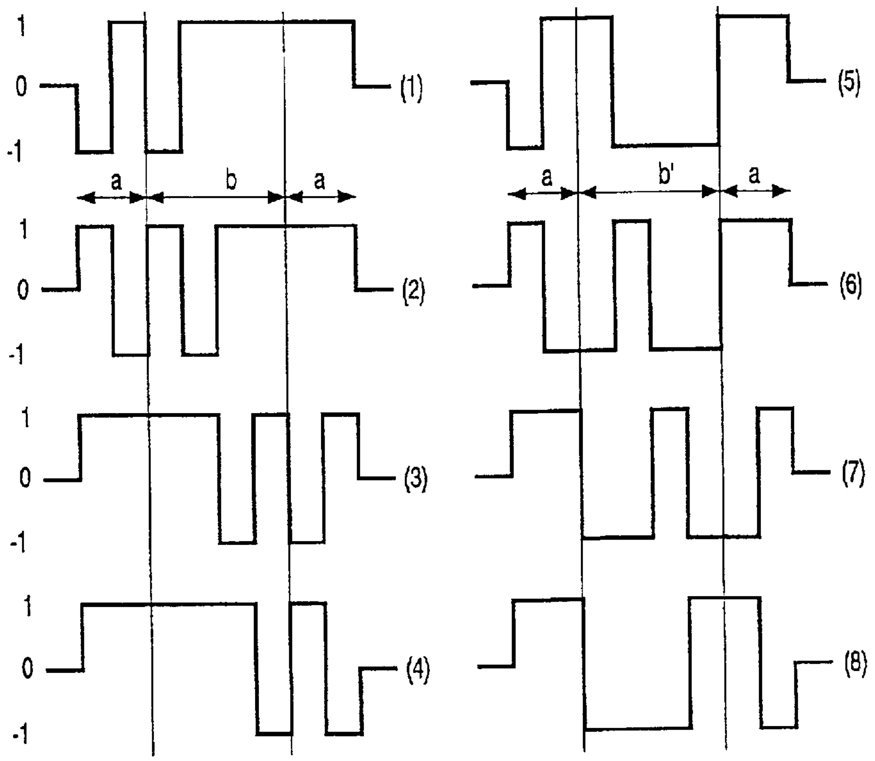

The set of K(uijk) functions can be further extended by mixing, as it were, the two types of orthogonal functions shown in FIG. 4 with four elementary units of time. FIG. 8 shows such a set K8(3,r). The pattern (1), in FIG. 8 is obtained by inserting pattern (1) of FIG. 4*a* again from the third position of pattern 1 (indicated as b in FIG. 8) and by subsequently completing pattern (1). The patterns (5), (6), (7) and (8) in FIG. 8 are obtained by inserting into the patterns (1), (2), (3) and (4) of FIG. 4 in the inverted form a pattern b. In this way pattern b and pattern a are interwoven, as if were. Patterns (2), (3) and (4) are obtained by shifting a negative pulse to the right within both part b and part a (formed by the two other parts). The pulse patterns derived from the patterns (5), (6), (7) and (8) in FIG. 8 are now again DC-free. Since this insertion can take place at four positions (elementary units of time) and the negative pulse can shift to the right and to the left, the possible number of functions based on pattern (1) of FIG. 3 is multiplied by 8. Since said inversion is also possible for the functions (2), (3) and (4) of FIG. 3, the total possible number of K(uijk) functions is 840.

The invention is of course not limited to the embodiments shown. Similarly as described above, more than 2 functions of FIG. 4 can be combined to obtain drive patterns with, for example, p=16.

The protective scope of the invention is not limited to the embodiments described. The invention resides in each and every novel characteristic feature and each and every combination of characteristic features. Reference numerals in the claims do not limit their protective scope. The use of the verb "to comprise" and its conjugations does not exclude the presence of elements other than those stated in the claims. The use of the article "a" or "an" preceding an element does not exclude the presence of a plurality of such elements.

What is claimed is:

1. A display device, comprising:

a liquid crystal between a first substrate provided with row or selection electrodes and a second substrate provided with column or data electrodes, said row electrodes and said column electrodes overlapping to define pixels;

column drive means for driving the column electrodes in conformity with an image to be displayed; and row drive means for driving the row electrodes which, in the operating condition, sequentially supply groups of p row electrodes with p mutually orthogonal signals, wherein the mutually orthogonal signals are pulses obtained from at least two types of orthogonal functions having four elementary units of time, within which four elementary units of time one pulse each time has a first polarity which opposes a second polarity of the other pulses.

2. The display device of claim 1, wherein the orthogonal signals are pulses obtained from orthogonal functions having four elementary units of time, within which four elementary units of time the one pulse having the first polarity which opposes the second polarity of the other pulses each time shifts by one elenentary unit of time.

3. The display device of claim 1, wherein the orthogonal signals are pulses obtained from orthogonal functions having four elementary units of time which, viewed in a time sequence, are situated one after the other.

4. The display device of claim 3, wherein at least two orthogonal signals have opposed DC contents.

5. The display device of claim 1 or 2, wherein the orthogonal signals are pulses obtained from orthogonal functions having four elementary units of time, in which the elementary units of the orthogonal functions are interwoven.

6. The display device of claim 1 or 2, wherein p=4, and in that four orthogonal signals have identical DC contents and four are free from a DC voltage.

7. The display device of claim 6, wherein the DC content of 2 orthogonal signals of the orthogonal signals having an identical DC content is opposed to that of the two other orthogonal signals.

8. The display device of claim 1 or 2, wherein said row drive means inverts the orthogonal signals after each frame period.

9. A display device, comprising:

a plurality of pixels defined by an overlapping of a plurality of row electroies and a plurality of column electrodes; and drive means for driving said plurality of row electrodes to sequentially supply groups of p row electrodes with p mutually orthogonal signals, wherein the p mutually orthogonal signals are pulses obtained from at least two types of orthogonal functions having four elementary units of time and wherein, for each elementary unit of time, one pulse has a first polarity that opposes a second polarity of the other pulses.

10. The display device of claim 9, wherein the one pulse having the first polarity which opposes the second polarity of the other pulses is shifted among the fourth elementary units of time.

11. The display device of claim 9, wherein the four elementary units of time viewed in a time sequence are situated one after the other.

12. The display device of claim 9, wherein at least two orthogonal signals have opposed DC contents.

13. The display device of claim 9, wherein the four elementary units of time are interwoven.

14. The display device of claim 9, wherein p=4; and wherein four orthogonal signals have identical DC contents and four orthogonal signals free from a DC voltage.

15. The display device of claim 14, the DC content of 2 orthogonal signals of the orthogonal signals having an identical DC content is opposed to that of the two other orthogonal signals.

16. The display device of claim 9, wherein said row drive means inverts the orthogonal signals after each frame period.

17. The display device of claim 1, wherein the first polarity is anegative polarity; and wherein the second polarity is a positive polarity.

18. The display device of claim 9, wherein the first polarity is a negative polarity; and wherein the second polarity is a positive polarity.

* * * * *